2 Sheets—Sheet 1.

L. A. DOLPH.

CARPET SWEEPER.

No. 11,541. Reissued May 26, 1896.

WITNESSES

Geverance

Harry E Hay

INVENTOR

Luther A Dolph by

Wm H Babcock

Attorney

2 Sheets—Sheet 2.

L. A. DOLPH.

CARPET SWEEPER.

No. 11,541. Reissued May 26, 1896.

WITNESSES

G. Everance

Harry E. Hay

INVENTOR

Luther A. Dolph by

Wm. H. Babcock

Attorney

UNITED STATES PATENT OFFICE.

LUTHER A. DOLPH, OF NORTH BENNINGTON, VERMONT.

CARPET-SWEEPER.

SPECIFICATION forming part of Reissued Letters Patent No. 11,541, dated May 26, 1896.

Original No. 555,935, dated March 10, 1896. Application for reissue filed April 10, 1896. Serial No. 587,034.

*To all whom it may concern:*

Be it known that I, LUTHER A. DOLPH, a citizen of the United States, residing at North Bennington, in the county of Bennington and State of Vermont, have invented certain new and useful Improvements in Carpet-Sweepers; and I do hereby declare the following to be a full, clear, and exact description thereof, such as will enable others skilled in the art to which it appertains to make and use the same, reference being had to the accompanying drawings, which form a part of this specification.

My invention relates to improved means for running the case in close contact with the carpet, to provisions for affording vertical accommodating adjustment of the wheel-frame and case to each other and to uneven places over which the sweeper has to pass, to devices for alternately elevating or depressing the nose of the dust-pan according as the motion of the rotary brush is reversed, and to provisions for screening the dust from the circulating current of air produced by the revolution of the brush as it passes from the machine.

I will first describe the construction of my apparatus and its mode of operation, after which the invention will be pointed out in the claims.

My invention is divisible into two parts. One of these is the wheel-frame and the other is the case. These are made in one sense independent of each other. In use the case slides along the surface of the carpet, so as to shut in all the dust, and the wheel-frame is free to accommodate itself to any uneven places in the surface over which it has to pass or can ride over slight obstacles without lifting the case so as to allow the escape of dust.

The drawings fully illustrate the invention, in which—

Figure 1:
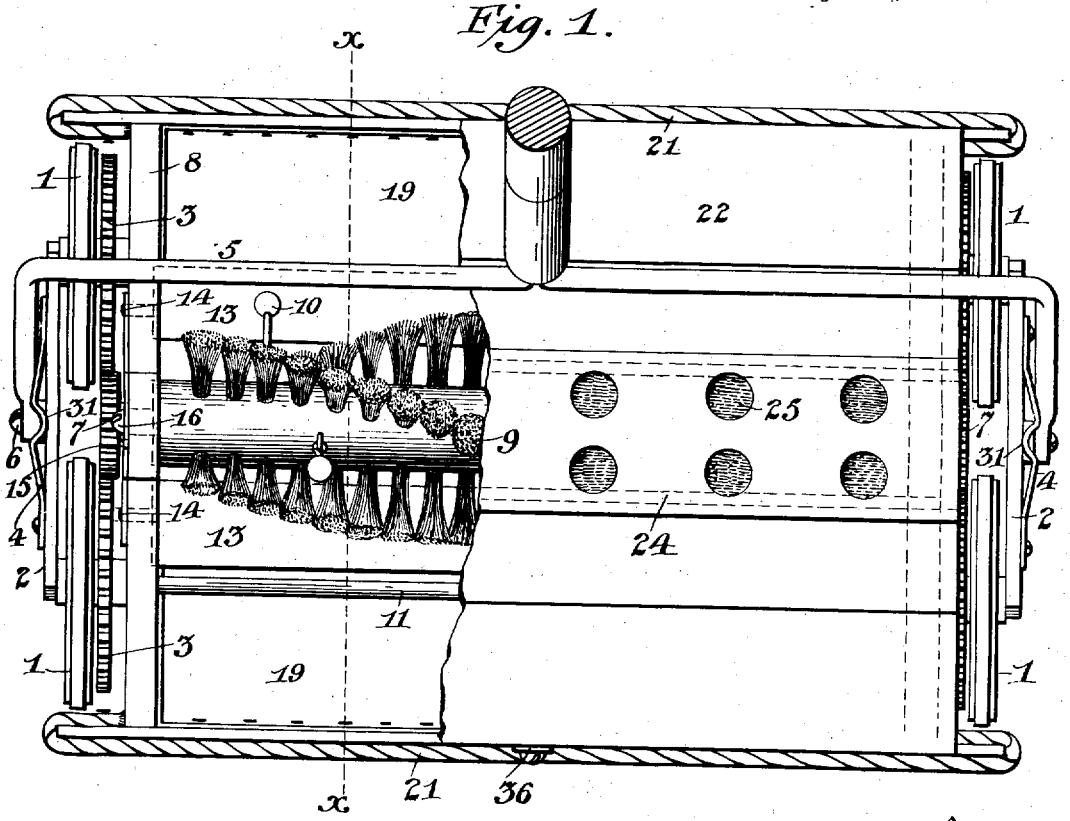
Figure 4:
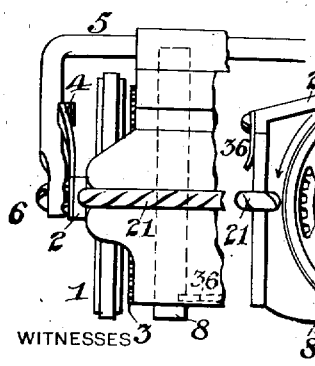
Figure 2:
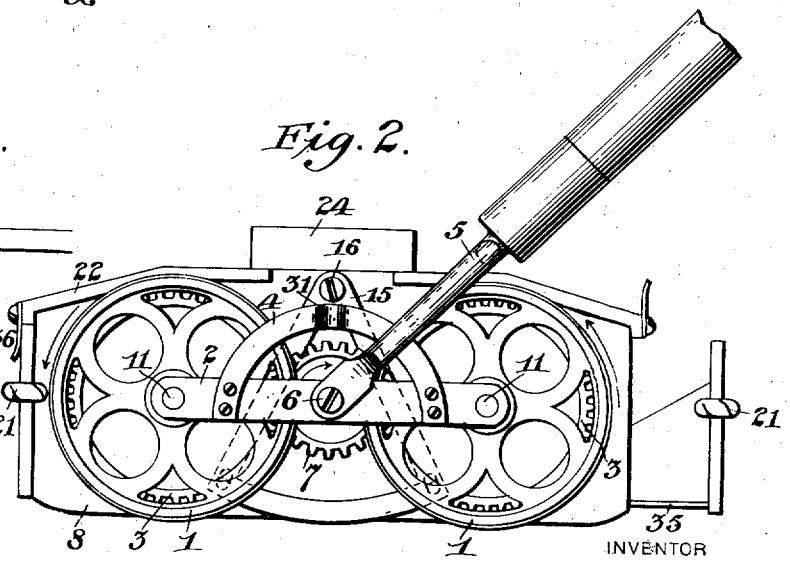
Figure 3:
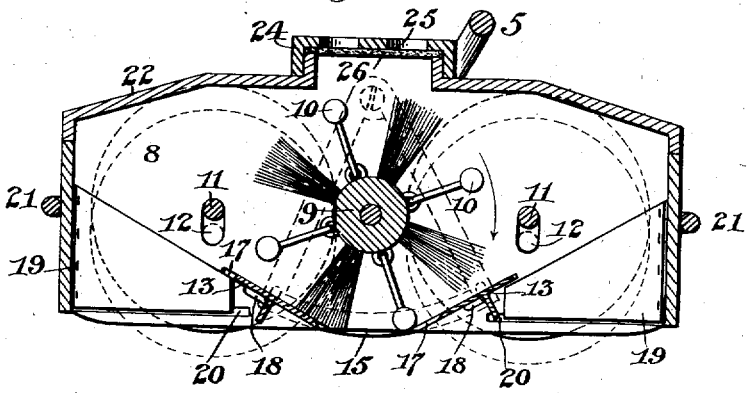
Figure 5:
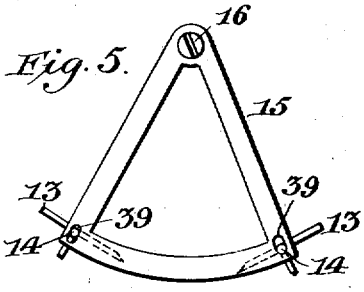
Figure 6:
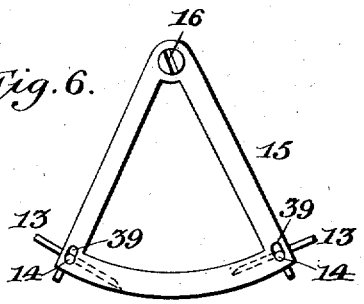
Figure 7:
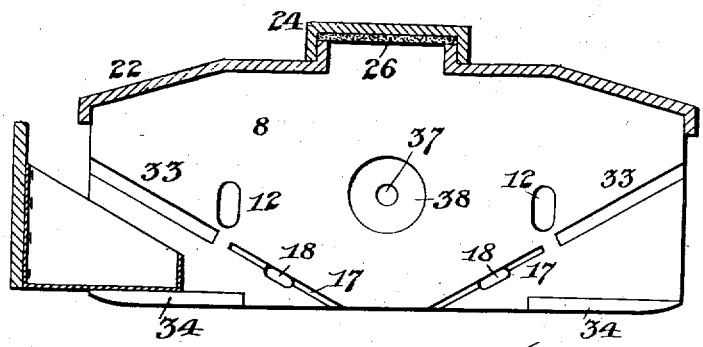
Figure 8:
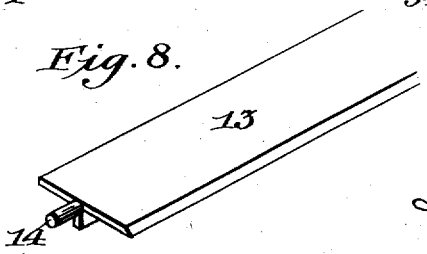

Figure 1 shows a plan view of my sweeper with a part of its cover removed. Fig. 2 is a side elevation of the same. Fig. 3 is a view of a transverse sectional elevation of the machine, taken on the line *x x* of Fig. 1. Fig. 4 is a partial elevation of the front corner of the sweeper. Figs. 5 and 6 show two positions of the apron-shifter. Fig. 7 is a view of the inside of one end of the case, the machinery being all removed except one of the dust-pans. This view also shows a modification of the dust-pan supports. Fig. 8 is a perspective view of one end of one of the dust-aprons.

The wheel-frame consists of the two axles 11 11, which are journaled in the side bars 2 2, as shown in Fig. 1, and are provided at each end with a wheel 1 and a gear 3. To the middle of each of the side bars an arm of the propelling-handle 5 is pivoted, whereby the sweeper may be propelled. On each side of the frame a semicircular yielding spring 4 is provided, which has a band 31 at or near its top, into which the handle 5 locks when it is desired to leave the handle standing upright. Thus the sweeper-truck consists of the two pairs of wheels, their axles, the side bars, and propelling-handle, the supporting-spring 4 being an accessory to the other parts.

The other parts are attached to or carried in the case 22 as follows: The case is of the ordinary form, except that it is provided with a dust-screen at its top, which consists of a rectangular elevated opening which is covered with a cap 24, through which are several openings 25. Between the under side of the cap and the top of the opening a sheet or two of cotton-batting or other suitable material is carried, as seen in Fig. 3. This batting permits the air to pass freely through it, but excludes the dust. The sweeper is arranged to be run in either direction, and so is provided with two dust-pans 19 19, one of which is shown in cross-section in Fig. 7. These pans run on slides 34 or are fitted with ledges 35, which run in grooves 20, as seen in Fig. 3. Each pan is protected by a cord or other suitable soft buffer-guard, which serves to prevent injury to furniture by running the sweeper against it. Inside the case and directly in front of each dust-pan a sliding inclined plane 13 is placed, the ends of which slide in the grooves 17, provided therefor in the side walls of the case. At or near the middle of these grooves each one is perforated, as at 18, for the reception of a pintle-stud 14, Fig. 8, which projects from each end of the aprons 13. These elongated slots 18 permit the aprons to slide up and down, so as to come in contact with the carpet or be elevated above it. The relative positions of these aprons are alternated, so as to raise one when the other is lowered, by means of a swinging sector 15, one of which is pivoted at 16 on each side of the case. The lower limb of this sector is designed to bear upon the surface of the carpet with sufficient frictional force, as when the sweeper is propelled along the carpet it will be thrown one way or the other, according to which way the machine is run. At each lower corner of the sector a bearing for the pintle-stud 14 is provided, in which the said studs are journaled, as shown in dotted lines in Fig. 2. Thus when the sweeper is propelled in one direction the apron which lies in front or in the path of the advancing brush will be drawn down so that its bottom edge will lie in close contact with the surface of the carpet, in which position the rotation of the brush will most effectually carry the dirt and litter up the apron and drive them over into the dust pan or drawer. Reversing the direction of movement of the machine will reverse the relative positions of the aprons.

The sweeping device consists of a cylindrical brush having its bristles set in helical courses with intervals between them, as is well understood. It is journaled in bearings 37 in the case, in which it can freely revolve. A circular recess 38, concentric with one of the said bearings, is formed in the inner face of the case on each side thereof to receive the end of the brush-shaft and allow the same to turn. These brush-journals project through the sides of the case sufficiently to take on the pinion-gears 7, one of which is preferably provided at each side of the case. These pinions gear into wheels 3, which are carried on the truck-axles 11. These gears transmit motion from the axles to the brush. The axles pass through vertically-elongated slots 12, Fig. 7, of the case, so that free vertical play between the two may be had. Thus if the wheels settle down into the pile of a soft plush or velvet carpet and the under edges of the case ride on the surface of the plush the slots 12 will permit accommodation of the elevation of the one to that of the other. This is a desirable feature, as it lets the case down onto the surface of the carpet at all times, thus preventing the escape of dust from beneath the sweeper. The edges of the truck-wheels may be fitted in any way to secure reliable frictional contact with the surface of the floor or carpet. In this instance the drawings show a rubber band for that purpose; but other means will serve.

The dust-drawers are secured in their places in the sweeper by a small clip or button 36, attached to the frame, as seen in Fig. 2. Whenever the drawers become loaded, by unfastening them they are easily emptied. In this instance I show a brush with considerable intervals between the helical rows of bristles. In these intervals are hung a number of small beaters or weights, which are connected to the shaft of the brush by short links, so that they can swing freely. The length of these is so regulated that they will just strike the surface of the carpet as the brush is rapidly revolved. The office of these beaters is to raise the dust, so that when it rises into the current of air produced by the revolving brush it will be driven over into the dust-pans or carried up and arrested by the screen or filter in the top of the case. These beaters add much to the efficiency of the machine.

Having thus described my invention, what I claim as new, and desire to secure by Letters Patent, is—

1. The combination of a sweeper-case with apron-reversing sectors pivoted thereto and adapted to drag on the surface to be swept, guides in the case, aprons connected to the sectors and adapted to slide in or on the guides and dust-receptacles supported within the case substantially as set forth.

2. The combination of inclined aprons with a sweeper-case in the ends of which they are adapted to slide into and out of position for use at will, and pivoted devices one for each apron attached independently to the said case and arranged to be operated automatically by contact with the surface to be swept, for moving the said apron into position, and dust-pans arranged at each end of the case in front of the apron, substantially as set forth.

3. The combination in a carpet-sweeper of a case in which a rotary brush is journaled, with a wheel-truck to which a propelling-handle is attached, and means interposed between the truck-wheels and brush for driving the latter from the former, the axles of the truck-wheels passing through openings in the case, enough larger than the diameter of the axles to permit either the case or the truck to have free vertical movement independently of the movement of the other.

4. In combination with a sweeper-case having vertical slots formed therein, a truck having driving-wheels mounted in it and a handle attached to the said truck, the shafts of the driving-wheels passing through the said slots, in order that the case and the truck may be vertically movable independently of each other.

In testimony whereof I have hereto affixed my signature in the presence of two witnesses.

LUTHER A. DOLPH.

Witnesses:

FRANKLIN SCOTT,

EMILY SCOTT.